United States Patent
Neill et al.

(10) Patent No.: US 10,547,667 B1
(45) Date of Patent: **\*Jan. 28, 2020**

(54) HETEROGENEOUS CLOUD PROCESSING UTILIZING CONSUMER DEVICES

(71) Applicant: CSC Holdings, LLC, Bethpage, NY (US)

(72) Inventors: Richard Neill, Syosset, NY (US); Alexander Shabarshin, Bethpage, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,821

(22) Filed: Aug. 8, 2016

Related U.S. Application Data

(63) Continuation of application No. 13/430,886, filed on Mar. 27, 2012, now Pat. No. 9,451,012.
(Continued)

(51) Int. Cl.
*H04L 29/08* (2006.01)
*H04L 12/46* (2006.01)
(Continued)

(52) U.S. Cl.
CPC .......... *H04L 67/10* (2013.01); *G06F 9/45558* (2013.01); *G06F 11/0709* (2013.01); *H04L 12/46* (2013.01); *G06F 2009/45562* (2013.01)

(58) Field of Classification Search
CPC ..... H04L 67/10; H04L 12/46; H04L 67/1097; H04L 67/1012; H04L 67/1029;
(Continued)

(56) References Cited

U.S. PATENT DOCUMENTS 6,990,662 B2 * 1/2006 Messer ............... G06F 9/505
709/204
8,296,419 B1 10/2012 Khanna et al.
(Continued)

OTHER PUBLICATIONS

Zhu, Wenwu, et al. "Multimedia cloud computing." Signal Processing Magazine, IEEE 28.3 (2011): 59-69.
(Continued)

*Primary Examiner* — Hitesh Patel
(74) *Attorney, Agent, or Firm* — Sterne, Kessler, Goldstein & Fox, P.L.L.C.

(57) ABSTRACT

A heterogeneous parallel processing system that includes a computer cluster system and a device cluster system is provided. The computer cluster system includes a computer cluster node that includes at least one cluster node processor. The device cluster system includes a cluster device that includes a cluster device processor, and is substantially different from the computer cluster nodes. The system includes a heterogeneous cluster node that includes a computer cluster node from the computer cluster system and a cluster device from the device cluster system. The heterogeneous cluster node includes a runtime environment module for transmitting data between the computer cluster node and the cluster device in the heterogeneous cluster node, such that at least one process executing on the device cluster system is transparent in its operation to a plurality of processes executing in the computer cluster system.

17 Claims, 8 Drawing Sheets

Related U.S. Application Data

(60) Provisional application No. 61/528,948, filed on Aug. 30, 2011.

(51) Int. Cl.
*G06F 11/07* (2006.01)
*G06F 9/455* (2018.01)

(58) Field of Classification Search
CPC ............... H04L 67/142; G06F 11/0709; G06F 2009/45562; G06F 9/45558; G06F 9/5083; G06F 11/1464; G06F 11/181; G06F 11/2028; G06F 11/203; G06F 3/0601; G06F 9/4881; G06F 9/505; G06F 9/5061; G06F 9/5066; G06F 9/5072
See application file for complete search history.

(56) References Cited

U.S. PATENT DOCUMENTS

| | | | | |
|---|---|---|---|---|
| 8,549,513 | B2* | 10/2013 | Vinberg | G06F 8/61 |
| | | | | 717/174 |
| 8,706,798 | B1* | 4/2014 | Suchter | G06F 9/5038 |
| | | | | 709/202 |
| 8,719,415 | B1 | 5/2014 | Sirota et al. | |
| 2004/0193674 | A1 | 9/2004 | Kurosawa et al. | |
| 2005/0204040 | A1* | 9/2005 | Ferri | G06F 9/5044 |
| | | | | 709/225 |
| 2005/0283788 | A1 | 12/2005 | Bigagli et al. | |
| 2006/0248294 | A1 | 11/2006 | Nedved et al. | |
| 2007/0245352 | A1* | 10/2007 | Ma | G06F 9/5038 |
| | | | | 718/105 |
| 2010/0162036 | A1 | 6/2010 | Linden et al. | |
| 2011/0066894 | A1 | 3/2011 | Berlyant et al. | |
| 2011/0154382 | A1 | 6/2011 | Chow et al. | |
| 2011/0289519 | A1* | 11/2011 | Frost | G06F 8/456 |
| | | | | 719/328 |
| 2011/0314465 | A1* | 12/2011 | Smith | G06F 9/5077 |
| | | | | 718/1 |
| 2012/0233610 | A1* | 9/2012 | Mandre | G06F 9/45558 |
| | | | | 718/1 |
| 2012/0278586 | A1* | 11/2012 | Caufield | G06F 9/505 |
| | | | | 711/173 |
| 2015/0278039 | A1* | 10/2015 | Bogdanov | G06F 11/2023 |
| | | | | 714/4.11 |

OTHER PUBLICATIONS

Chieu, Trieu. C., et al. "Dynamic scaling of web applications in a virtualized cloud computing environment." e-Business Engineering, 2009. ICEBE'09. IEEE International Conference on. IEEE, 2009.

Shvachko, Konstantin, et al. "The hadoop distributed file system." Mass Storage Systems and Technologies (MSST), 2010 IEEE 26th Symposium on. IEEE, 2010.

Schmuck, Frank B., and Roger L. Haskin. "GPFS: A Shared-Disk File System for Large Computing Clusters." FAST. vol. 2. 2002.

Tang, Hong, et al. "A self-organizing storage cluster for parallel data-intensive applications." Proceedings of the 2004 ACM/IEEE conference on Supercomputing. IEEE Computer Society, 2004.

Al-Jaroodi, Jameela, et al. "Middleware infrastructure for parallel and distributed programming models in heterogeneous systems." Parallel and Distributed Systems, IEEE Transactions on 14.11 (2003): 1100-1111.

Nurmi, Daniel, et al. "The eucalyptus open-source cloud-computing system." Cluster Computing and the Grid, 2009. CCGRID'09. 9th IEEE/ACM International Symposium on. IEEE, 2009.

Warneke, Daniel, and Odej Kao. "Exploiting dynamic resource allocation for efficient parallel data processing in the cloud." Parallel and Distributed Systems, IEEE Transactions on 22.6 (2011): 985-997.

* cited by examiner

HETEROGENEOUS CLOUD PROCESSING UTILIZING CONSUMER DEVICES

CROSS-REFERENCE TO RELATED APPLICATIONS

This application is a continuation of U.S. patent application Ser. No. 13/430,886, filed on Mar. 27, 2012, now U.S. Pat. No. 9,451,012, which claims the benefit of U.S. Provisional Application No. 61/528,948, filed on Aug. 30, 2011, each of which is incorporated by reference in its entirety.

BACKGROUND OF THE INVENTION

Field of the Invention

Embodiments relate generally to process executing on a heterogeneous computing environment.

Background Art

In conventional parallel processing system, each computer cluster node executes software processes that includes process information associated with other processes executing on one or more computer cluster nodes. Executing software processes use process information to communicate with other processes within the parallel processing system. The process information is compiled in a listing that may be stored in memory storage on each computer cluster node. Typically, the process information listing is compiled by a master node that obtains process information from each computer cluster node. Master node then transmits the process information listing to the computer cluster nodes in the conventional parallel processing system.

This conventional technique however does not work in a parallel processing system that includes heterogeneous computing devices, where each device has different memory size and processor speed. For example, a process information listing that includes process information for millions of processes may overload computing devices that have a limited memory and processing power, such as embedded devices that include set-top boxes, mobile devices, game consoles, tablets and smart television sets, to name a few.

For instance, process information for each process may not take up a lot of memory space, such as, in a non-limiting example, 500 bytes. However, when a parallel processing system includes N computing devices and P processes on each computing device, the process information listing may have the size of P*N*500 bytes. In a large parallel processing system, a number of P processes may be several million, and each computing device may require one gigabyte (1 GB) or more of data to store the processes information listing.

In a heterogeneous parallel processing system, many computing devices are not equipped with this amount of memory storage. Additionally, using a network to transfer 1 GB or more of data to each computing device requires significant broadband and transfer time. This will introduce excessive latencies and interfere with processes execution and data transfer within the parallel processing system.

SUMMARY OF THE INVENTION

A heterogeneous parallel processing system is provided. The system includes a computer cluster system and a device cluster system. The computer cluster system includes at least one computer cluster node that includes at least one cluster node processor. The device cluster system includes at least one cluster device that includes at least one cluster device processor, the cluster device being substantially different from the computer cluster nodes. The system also includes a heterogeneous cluster node. The heterogeneous cluster node includes at least one computer cluster node from the computer cluster system and at least one cluster device from the device cluster system. The heterogeneous cluster node also includes a runtime environment module configured to transmit data between the at least one computer cluster node and the at least one cluster device in the heterogeneous cluster node, such that at least one process executing on the device cluster system is transparent in its operation to a plurality of processes executing in the computer cluster system.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Figure 1:
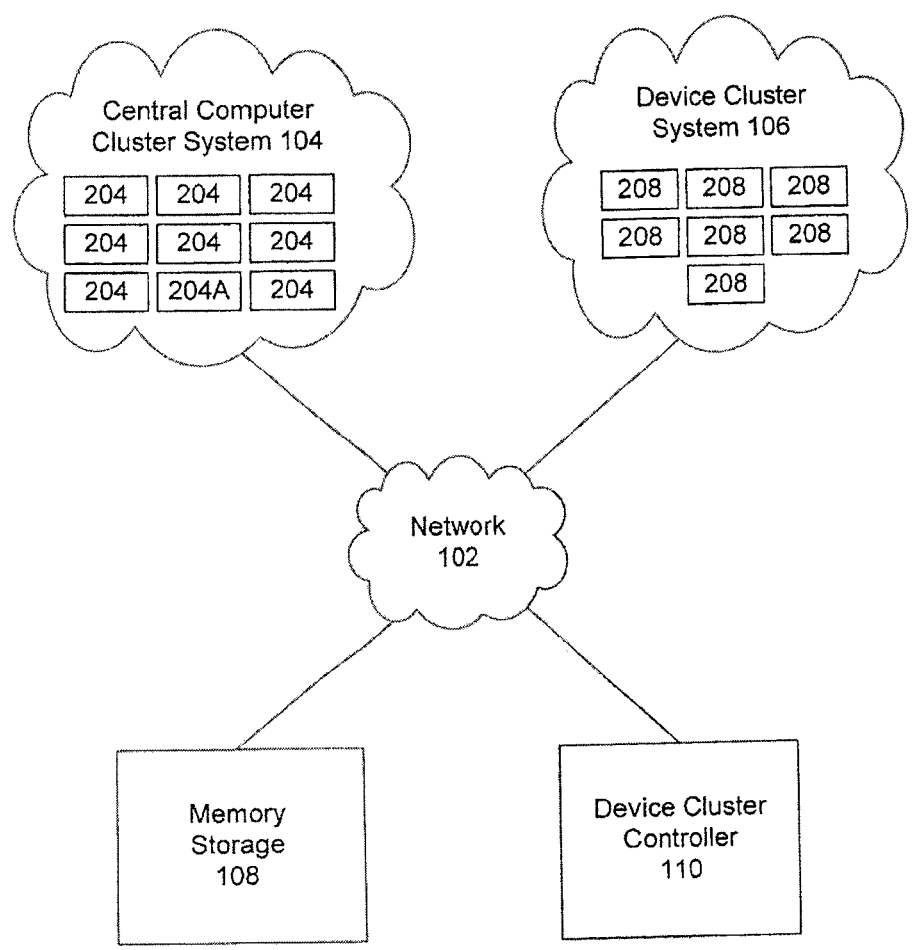
FIG. 1 is a block diagram of a heterogeneous parallel processing system where the embodiments of the invention may be implemented.

FIG. 1 is a block diagram 100 of a heterogeneous parallel processing system where the embodiments of the invention may be implemented.

Exemplary heterogeneous parallel processing system includes a network 102, a central computer cluster system 104, a device cluster system 106, and a memory storage 108.

Network 102 may be any network or combination of networks that can carry data communication between the components included in a heterogeneous parallel processing system. Such network 102 may include, but is not limited to, wired or wireless local area network, metropolitan area network, and/or wide area network such as the Internet. Network 102 can support protocols and technologies including, but not limited to, World Wide Web protocols and/or services. Intermediate web servers, gateways, or other servers may be provided between components of the system shown in FIG. 1, depending upon a particular application or environment.

Network 102 also includes a local area network. Local network provides wired and wireless connectivity with various networks and network-enabled devices, including computers, the Internet, telephones, etc. Additionally, network 102 includes networks such as analog telephones, X10, Fiber Optic, and other home automation communications, and the like. Network 102 may also include network switches and broadband routers.

Central computer cluster system 104 includes multiple central computer nodes 204. Central computer node 204 may include applications and systems for processing data requests from other central computer cluster nodes 204 or device cluster system 106. In a non-limiting example, central computer cluster system 204 may include a network of nine-blade servers, where each server is a central computer node 204.

Figure 7:
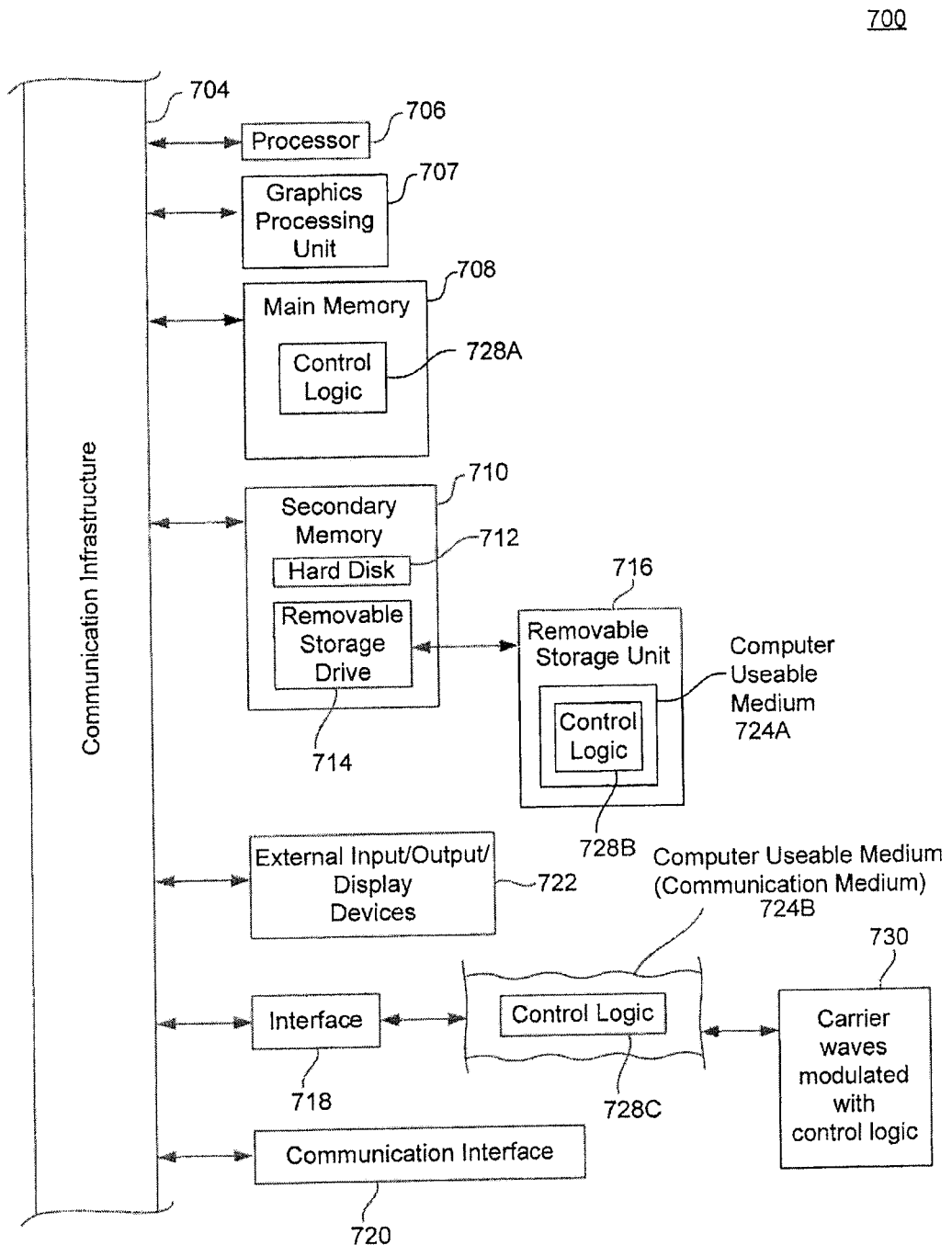
FIG. 7 is a block diagram of a computing environment where the embodiments of the invention may be implemented.

Central computer node 204 includes central processing unit (CPU) processors (also referred to as "processors"), volatile and non-volatile memory storage and a communication interface (described in detail in FIG. 7). Central computer node 204 may also execute an operating system, such as in a non-limiting example, an open-source Linux operating system. Typically, central computer nodes 204 are designed to process large quantities of data and are equipped with processors and large amount of volatile and non-volatile memory storage to accommodate this type of processing.

Device cluster system 106 includes multiple cluster devices 208. Each cluster device 208 may be a computing device such as a smart phone, a tablet or any other electronic device under a control of a user, to name only a few. In another embodiment, cluster device 208 may include a set-top-box (STB) that is connected to network 102. An STB receives media content from computer cluster system 204 and displays the media content to a user using, for example, a television screen, a personal computer, a computer tablet, a mobile or another computing device.

Cluster device 208 includes a CPU processor, a floating-point unit, a graphics processing unit (GPU) processor, volatile and non-volatile memory and other components described in detail FIG. 7. CPU processor on cluster device 208 may comprise a dual-core, system-on-chip processor or another processor common in cluster devices 208 described above. Typically, cluster device 208 includes a fraction of a memory and processing power as compared to computer cluster node 204.

In an embodiment, central computer cluster system 104 also includes host node 204A. Host node 204A is computer cluster node 204 that includes a runtime environment that includes processes, modules and applications that communicate with device cluster system 106. Host node 204A enables communication and data sharing between central computer cluster system 106 and device cluster system 106. Host node 204A and device cluster system 106 comprise a heterogeneous cluster node 202, as described below.

The runtime environment on host node 204A may be initialized through a master node (not shown). A master node may be a module executing on computer cluster node 204 within central computer cluster system 104. The master node distributes the workload to processors in the heterogeneous parallel processing system. The master node also requests, distributes and aggregates process information for processes that were launched on processors within heterogeneous parallel processing system to execute the workload.

Memory storage 108 stores applications, data, configuration files, etc. that are being accessed by central computer cluster system 104 and device cluster system 106. Memory storage 108 may provide a file-system partition for storing applications and data for each process that executes in the heterogeneous parallel processing system. In an embodiment, memory storage 108 may be a two-terabyte memory storage or other storage capable of storing large quantities of data and applications. In an embodiment, memory storage 108 may be mounted on central computer nodes 204 associated with computer cluster system 104 and cluster devices 208 associated with device cluster system 106. A person skilled in the art will appreciate that when a memory storage is mounted on a computing device, a computing device is granted access to the memory storage without the data being physically stored on the computing device.

In an embodiment, a heterogeneous parallel processing system also includes a device cluster controller 110. Device cluster controller 110 communicates with device cluster system 106 using network 102. Device cluster controller 110 provides commands and applications to device cluster system 106. Example device cluster controller 110 may be digital cable head-end that provides interactive services, such as television services, to device cluster system 106, where each cluster device 208 is an STB. Digital head-end provides interactive services such as, in a non-limiting example, electronic program guides, user-interface, video-on-demand (VOD), and the delivery of digital video sources in the MPEG-2 formats. One digital head-end provides the interactive services, heterogeneous parallel processing system provides processing instructs that process those services in a device cluster system 106.

Figure 2A:
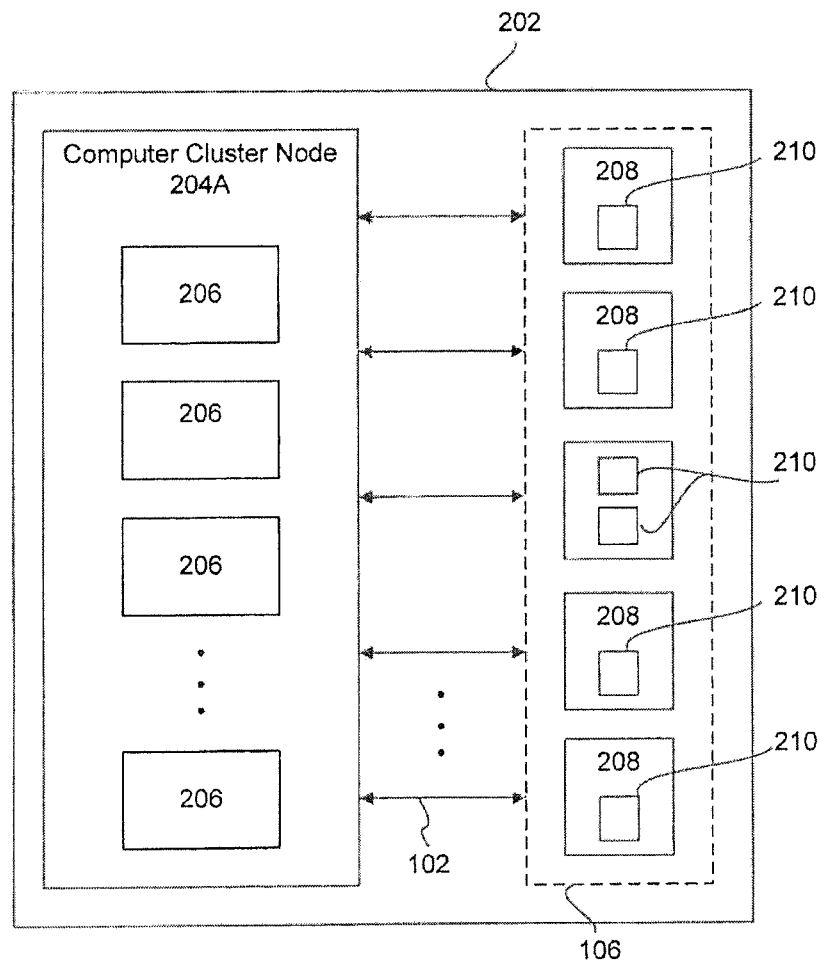
FIG. 2A is a block diagram of a heterogeneous computer cluster node, according to an embodiment.

FIG. 2A is a block diagram 200A of a heterogeneous computer node, according to an embodiment. Heterogeneous cluster node 202 includes host node 204A and a device cluster system 106. Host node 204A includes the process information for processing executing on host node 204A and other central computer nodes 204. Host node 204A also executes a runtime environment that enables device cluster system 106 to access computer cluster nodes 204 associated with central computer cluster system 104.

Heterogeneous cluster node 202 includes processors 206 that are associated with host node 204A and processors 210 that are associated with cluster devices 208 in device cluster system 106. As described herein, processors 210 have less processing power than processors 206. The total amount of processors that are included in heterogeneous cluster node 202 is the sum of processors 206 included on host node 204A and processors 210 included in device cluster system 106. For example, when cluster devices 208 include K number of processors 210 and host node 204A includes J number of processors 206, the total number of processors in a heterogeneous cluster node 202 is equal to J+K. Also, computer cluster nodes 204 in central computer cluster system 104 identify heterogeneous cluster node 202 as another computer cluster node 204 that comprises J+K processors.

Host node 204A and device cluster system 106 may use network 102 to exchange messages and data. Similarly, heterogeneous cluster node 202 and computer cluster system 104 may also use network 102 to exchange messages and data.

Figure 2B:
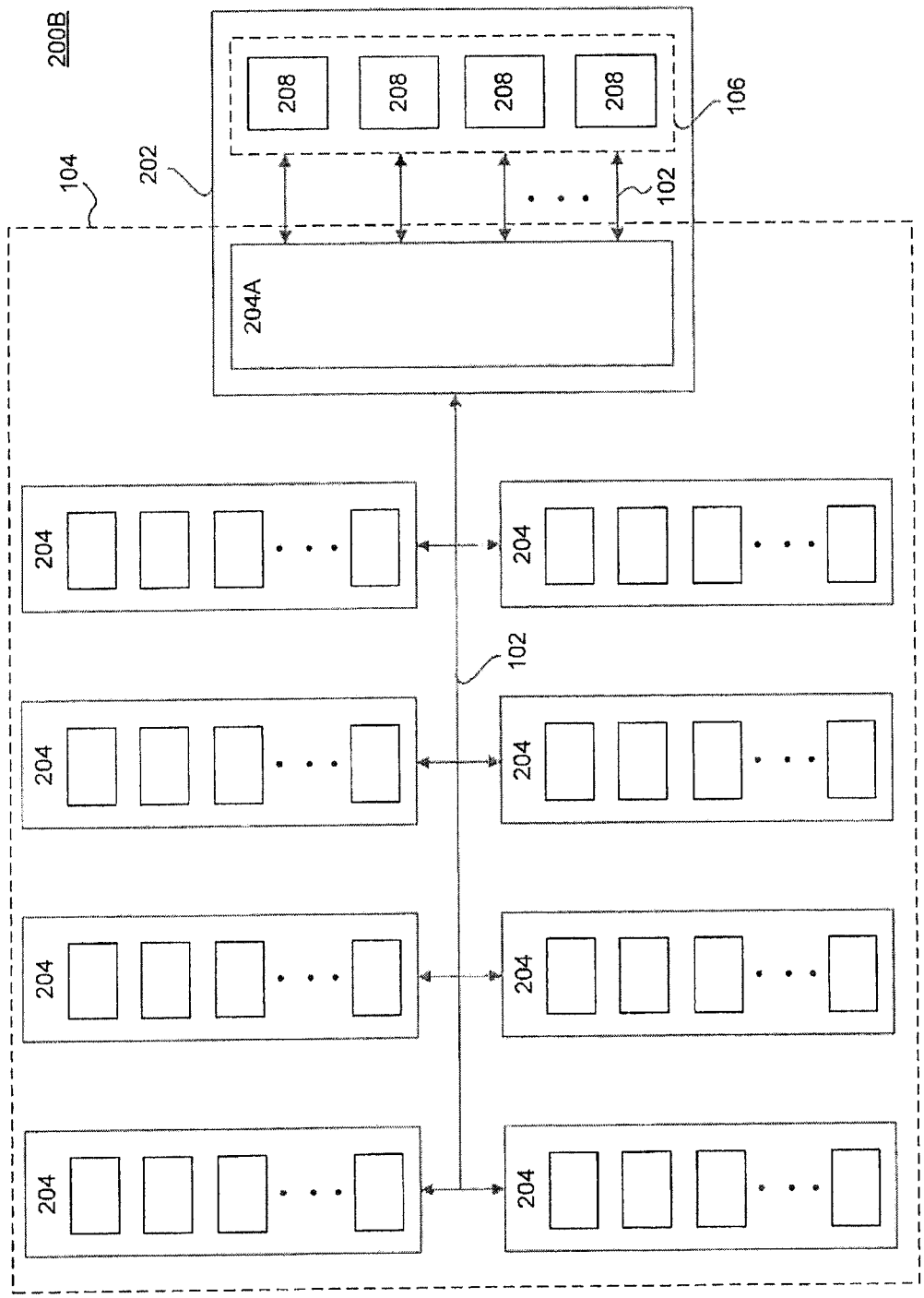
FIG. 2B is a block diagram of a heterogeneous parallel processing system that includes a heterogeneous computer cluster node, according to an embodiment.

FIG. 2B is a block diagram 200B of a heterogeneous parallel processing system that includes a heterogeneous cluster node, according to an embodiment. Heterogeneous parallel processing system includes computer cluster nodes 204 associated with central computer cluster system 104 and heterogeneous cluster nodes 202 that include device cluster systems 106. Although, FIG. 2B includes one heterogeneous cluster node 202, the invention is not limited to this embodiment.

Heterogeneous parallel processing system includes a total number of processors as the sum of processors 206 in central computer nodes 204, and the sum of processors 206 and processors 210 in heterogeneous cluster node 202.

As described herein, host node 204A in heterogeneous cluster node 202 includes a runtime environment. The runtime environment allows for the flow of data and messages between computer cluster system 104 and device cluster system 106. For example, the runtime environment facilitates the flow of messages and data by mapping cluster devices 208 in device cluster system 106 into a processing domain of host node 204A.

Each cluster device 208 also includes a runtime environment that enables cluster device 208 to communicate with computer cluster system 104. For example, when cluster device 208 begins executing processes, the runtime environment on cluster device 208 maps the executing process into the runtime environment of host node 204A. As host node 204A is a computer cluster node 204, host node 204A exchanges messages and data with other computer cluster nodes 204 within computer cluster system 104.

Upon start-up, each cluster device 208 mounts a remote file system included in memory storage 108. The mount allows each cluster device 208 to access data stored in memory storage 108. Processes executing on cluster device 208 may access memory storage 108 and retrieve data for processing. Similarly, each central computer node 204 mounts the remote file system included in memory storage 108 to access and process data.

Figure 3:
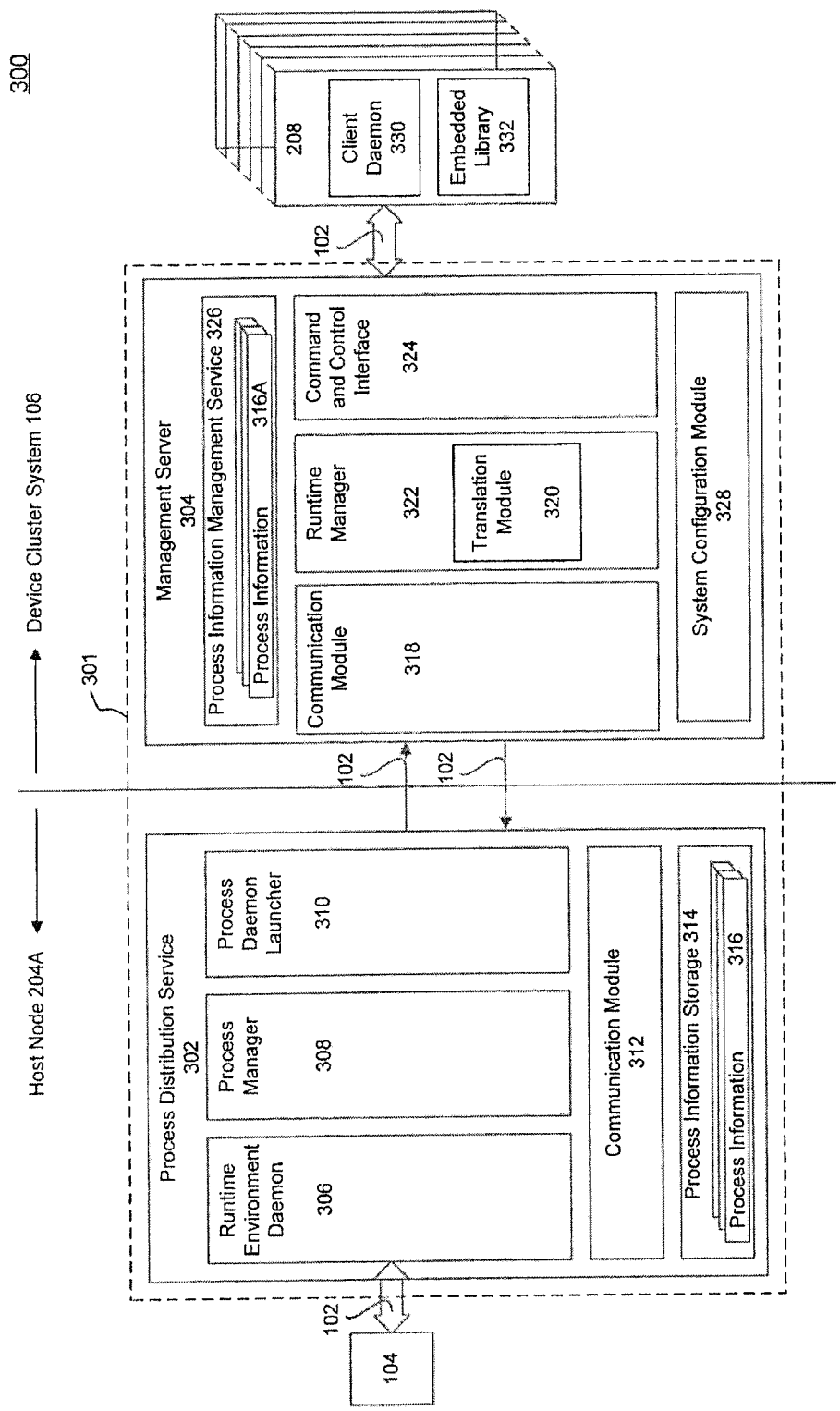
FIG. 3 is a block diagram of a runtime environment, according to an embodiment.

FIG. 3 is a block diagram 300 of a runtime environment, according to an embodiment. In central computer cluster nodes 204, runtime environment 301 distributes the workload to processors 106. On heterogeneous computer cluster node 202, runtime environment 301 distributes the workload to cluster devices 108 within device cluster system 106 through host node 204A. In an embodiment, runtime environment 301 may be implemented using distributed computational environments, such as message passing interface (MPI), such as Open MPI or a Map Reduce software framework implemented by Google, Inc. of Mountain View, Calif. Example Map Reduce framework is implemented in an open-source Apache™ Hadoop™ framework.

Runtime environment 301 manages the mapping of the processes between host node 204A and device cluster system 106, launches the processes, (such as MPI processes in Open MPI), manages the process lifecycle during the execution and handles error messages. In a further embodiment, a system administrator may configure and reconfigure runtime environment 301 to adapt to the demands of the heterogeneous parallel processing system or to include additional cluster devices 208.

Runtime environment 301 includes a process distribution service 302, a management server 304, a client daemon 330 and an embedded library 332.

Process distribution service 302 may be an application or a module that executes on host node 204A. Process distribution service 302 includes a runtime environment daemon 306, a process manager 308, a process daemon launcher 310, a communication module 312 and a process information storage 314.

Runtime environment daemon 306 initiates process distribution service 302 on host node 204A or computer cluster node 204. Runtime environment daemon 306 may be invoked by any server within computer cluster system 104 that acts as a master node for cluster nodes 204 and heterogeneous cluster nodes 202. In an embodiment, the master node may invoke runtime environment daemon 306 using a remote execution protocol, such as remote shell protocol (RSH) or secure shell protocol (SSH), or using a process launcher communication protocol. In a non-limiting example, process launcher communication tool (not shown) may be an application that loads a configuration file that includes address of each computer cluster node 204 or host node 204A. Once the configuration file is loaded, the master node sends a message to initiate runtime environment daemon 306 on computer cluster nodes 204 and host nodes 204A.

Process manager 308 maps the processes in computer cluster node 204 or host node 204A. On computer cluster node 204, process manager 308 maps processes to processors 206. On a heterogeneous cluster node 202, process manager 308 maps processes to processors 210 on cluster devices 208. Process manager 308 also manages the execution and life-cycle of each process. For example, process manager 308 initializes a particular process, launches an application that executes using the process, signals a message delivery to each process when a message arrives from, for example, central cluster system 102 or memory storage 108, and terminates the process.

Process daemon launcher 310 launches and terminates each process within computer cluster node 204 or heterogeneous cluster node 202. On computer cluster node 204 process daemon launcher 310 launches processes that execute on processors 206. On host node 204A process daemon launcher 310 launches management server 304 that manages processes on cluster devices 208.

Process daemon launcher 310 also manages process information 316 in process information storage 314 (described below), and communications between the launched processes and runtime environment daemon 306.

Process daemon launcher 310 also manages processes using command functions.

On computer cluster node 204, process daemon launcher 310 executes command functions to launch, terminate or communicate with the processes. On a host node 204A, process daemon launcher 310 passes command functions to management server 304.

Exemplary and non-limiting command functions are "launch_local_proc," "kill_local_proc," and "signal_local_proc." For example, command function "launch_local_proc" may launch processes on computer cluster node 204 or cluster device 208. In an embodiment, "launch_local_proc" may specify the number of processes that may be launched. In another example, command function "kill_local_proc" terminates a configurable number of processes. In another example, command function "signal_local_procs" passes commands from an operating system to the processes. For example, management server 304 uses "signal_local_procs" command function to pass command "SIG-STOP" to a Linux operating system for a process executing on cluster device 208.

Communication module 312 is a communication interface that distributes message between host nodes 204A and computer cluster nodes 204 within central computer system 104. Communication module 312 also distributes messages between host nodes 204A and a master node.

Process information storage 314 stores process information 316 associated with processes that execute on computer cluster nodes 204 and/or heterogeneous cluster node 202. In an embodiment, processes information may be stored as a data structure. Process information 316 for each process includes a web address and web port number information associated with computer cluster node 204 or cluster device 208 that executes the process. Computer cluster nodes 204, host nodes 204A, and the master node may require process information associated with the processes in heterogeneous parallel processing system to distribute workload for execution, to monitor the workload that is being executed, and to allow processes within computer cluster nodes 204 and device cluster system 106 to communicate with each other.

Management server 304 manages processes that execute on device cluster system 106. Management server 304 may be a stand-alone server or may execute on host node 204A. In an embodiment, management server 304 is a multi-threaded server, implemented, for example, using Java, C, or C++ programming languages.

Management server 304 includes a communication module 318, a runtime manager 322 and a command and control interface 324.

Communication module 318 communicates with process distribution server 302. For example, communication module 318 receives messages from process distribution service 302 that include command functions, such as "launch_local_proc," "kill_local_proc," and "signal_local_procs". Once management server 304 receives command functions from process daemon launcher 310, it propagates the command functions to cluster devices 208 or executes the command functions.

Management server 304 may also transmit the results of the command functions back to process daemon launcher 310. For example, a "launch_local_proc" command function may return a parameter that indicates that the process has launched successfully or has failed. In an embodiment, management server 304 uses communication module 318 to transmit messages to daemon launcher 310.

Management server 304 also receives a "deliver_message" command function. A "deliver_message" command function passes process information between process distribution service 302 and management server 204.

When communication module 318 receives messages from process distribution service 302, communication module 318 passes the messages to runtime manager 322. Runtime manager 322 uses a translation module 320 to translate the messages into a format that is executed or interpreted on cluster device 208. In an embodiment, translation module 320 may translate messages from process distribution service 302 into an object oriented representation of a message, in for example, Java or C++ programming languages.

When translation module 320 translates the messages, runtime manager 322 passes the messages to command and control interface 324. Runtime manager 322 also identifies cluster device 208 that may process those messages. For example, runtime manager 322 may identify cluster devices 208 using process information 316A stored in process information management service 326. In another example, a message may include cluster device 208 information.

Command and control interface 324 communicates with cluster devices 208 in device cluster system 106. Command and control interface 324 receives a translated message from runtime manager 322 and transmits the translated message to the designated cluster device 208 for processing.

When cluster device 208 completes processing the translated message, cluster device 208 may return a response message that includes the result of the processing to command and control interface 324. Command and control interface 324 then passes the response message to runtime manager 322. Runtime manager 322 uses translation module 320 to translate the response message into a format that is executed or interpreted by process distribution service 302. Communication module 318 then transmits the response message to process distribution service 302.

Management server 304 also includes a process information management service 326. Process information management service 326 stores processing information 316A for processes that execute within device cluster 106. As described herein, process information 316A includes web address and web port information associated with computer cluster nodes 204 within computer cluster system 104 and cluster devices 208 within device cluster system 106. Process information 316A also includes information pertaining to each process, such as process identifier, etc. In a heterogeneous parallel processing system, processes require process information 316A associated with other processes to communicate with one another for execution of point-to-point operations and collective communication operations. In a heterogeneous cluster node 202 process information 316A may be a subset of process information 316.

Because cluster devices 208 have a limited amount of memory compared to computer cluster nodes 204, cluster devices 208 do not store complete process information 316 for processes within heterogeneous parallel processing system. Instead, process information management service 326 stores process information 316A for processes executing on cluster devices 208 within device cluster system 106. Process information management service 326 may also store process information 316A associated with processes executing in computer cluster system 104.

When process daemon launcher 310 initializes management server 304, process distribution service 302 uploads a configuration file that defines runtime parameters for device cluster system 106. Those runtime parameters are stored as process information 316A within process information management service 326. When management server 304 initializes a process on cluster node 208, process information 316A is appended with information pertaining to the initialized process, such as in a non-limiting example, a process identifier. Process information 316A may also be appended with process information from other processes in computer cluster system 104.

When process distribution service 302 requests process information 316A for processes executing within device cluster system 106, process daemon launcher 310 makes, for example, a "deliver_message" request for process information 316A to management server 304. In response to the "deliver_message" request, management server 304 returns process information 316A to process distribution service 302. Process distribution service 302 may then forward process information 316A to the master node.

When a master node receives process information 316A from the heterogeneous cluster node 202 and process information 316 from computer cluster nodes 204 it aggregates the information into a process information listing. The master node then transmits the process information listing to heterogeneous cluster node 202 and computer cluster nodes 204. However, unlike conventional distributed systems, heterogeneous cluster node 202 stores the received process information listing within a memory storage accessible to management server 304 and process distribution service 302.

When processes executing on cluster devices 208 request process information 316A, cluster device 208 makes a request to management server 304 for process information 316A. In response, management service 304 uses command and control interface 324 to transmit process information 316A to the requesting process on cluster device 208. When management server 304 does not include process information 316A requested by the requesting process, process management server 304 attempts to query process information 316 in process information storage 314 on process distribution service 302. If unsuccessful, process distribution service 302 may query the master node for the requested process information.

Cluster devices 208 execute processes assigned for execution by a master node or process distribution service 302. As described herein, command and control interface 324 transmits the translated command function to launch a process from management server 204 to cluster device 208. To execute processes and communicate with process management server 304, cluster devices 208 include a client daemon 330 and an embedded library 332. Embedded library 332 includes resources that client daemon 330 uses to communicate with management server 304 and execute processes. In an embodiment, embedded library 332 may be optimized for a limited memory environment within cluster devices 208.

Client daemon 330 is an application or a module that executes as a background process on each cluster device 208. In an embodiment, client daemon 330 may be a background thread that executes, in a non-limiting example, on a Linux operating system.

Client daemon 330 accesses applications that are local to cluster device 208 or stored in memory storage 108. Once client daemon 330 accesses applications, client daemon 330 provides a runtime execution environment for executing the accessed applications. For example, client daemon 330 launches a process for executing an application, requests process information 316A for the requesting processes, communicates between cluster device 208 and computer cluster nodes 204 through management server 304, redirects the I/O between cluster device 208 and management server 304, and terminates the process, to name only a few.

Figure 4:
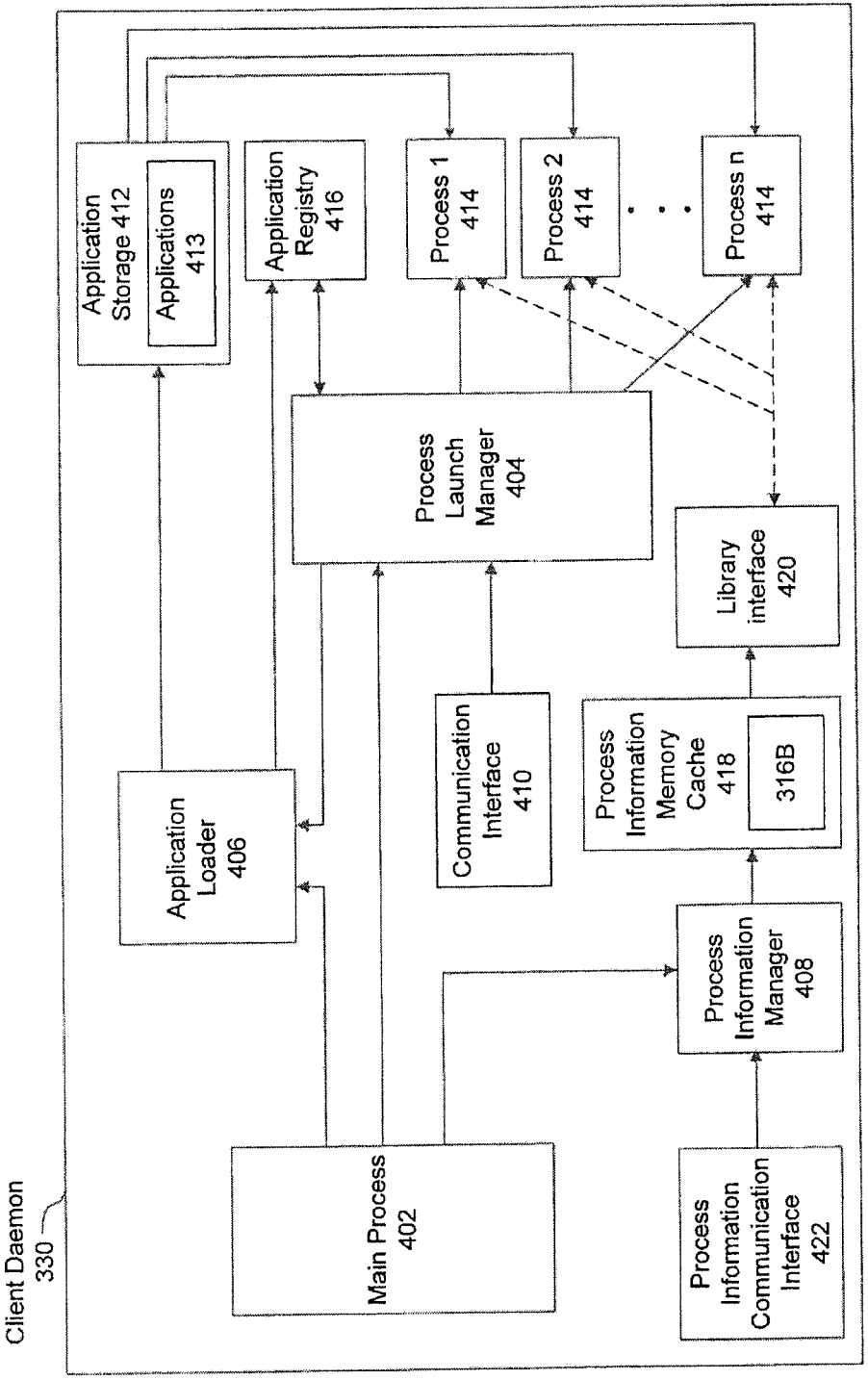
FIG. 4 is a block diagram of a runtime environment on a cluster device, according to an embodiment.

FIG. 4 is a block diagram 400 of a client daemon, according to an embodiment. Client daemon 330 includes a main process 402. Cluster device 208 initializes main process 402, for example, when cluster device 208 is being rebooted or when a user activates cluster device 208. In an embodiment, main process 402 may be initialized using a boot script, such as, in a non-limiting example, an rc.local boot script in a Linux operating system or another script developed by an application developer. Once initialized, main process 402 executes as a background process on cluster device 208. For example, main process 402 waits for messages from the command and control interface 324 on management server 304, as cluster device 208 executes other processes or applications.

Once cluster device 208 initializes main process 402, main process 402 initializes a process launch manager 404, an application loader 406 and a process information manager 408. In an embodiment, process launch manager 404, application loader 406 and process information manager 408 may be initialized as threads that execute asynchronously within client daemon 330.

Process launch manager 404 handles communications with management server 304. For example, process launch manager 404 manages the application lifecycle by processing command functions from management server 304 to launch processes 414, deliver messages to processes 414 and terminate processes 414. In an embodiment, process launch manager 404 handles communications with management server 304 through a communication interface 410 and over network 102. In a non-limiting example, communication interface 410 may process messages using a transmission control protocol and internet protocol (TCP/IP) interface.

Process launch manager 404 launches processes 414. Processes 414 execute applications 413 on cluster device 208. For example, in a Linux operating system environment, process launch manager 404 may execute a function "fork( ).execute( )" that launches process 414. Once process 414 is launched, process 414 accesses and loads the application 413 from application storage 412. In an embodiment, process launch manager 404 may launch up to "N" processes 414. A person skilled in the art will appreciate that a number of processes 414 executing on cluster device 208 may be restricted by the number of available resources or by the operating system on cluster device 208.

In an embodiment, prior to initializing process 414, process launch manager 404 accesses an application registry 416. Application registry 416 stores a listing of applications 413 that are stored in application storage 412. If application 413 is not included in the listing, process launch manager 404 may not launch process 414.

Application loader 406 loads applications 413 into application storage 412. Application storage 412 stores applications 413. In an embodiment, applications 413 may receive, format or display content, such as media content or streaming media content. Applications 413 may also include applications for web browsing, text messaging, image processing, etc., to name only a few.

Application loader 406 loads application 413 for a sequential or concurrent access by processes 414. In an embodiment, application loader 406 may retrieve applications 413 from memory storage 108. Application loader 406 may also download applications 413 outside of the heterogeneous parallel processing system using network 102, a thumb-drive, a compact disk, etc.

Process information manager 408 manages process information 316B on cluster device 208. Process information 416B on cluster device 208 may be a subset of process information 316A stored on management server 304. Process information 316B is stored in a memory storage, such as process information memory cache 418. When process information manager 408 receives process information 316B from management server 304, process information manager 408 stores process information 316B in a process information memory cache 418.

Process 414 accesses process information 316B stored in process information memory cache 418 through library interface 420. Library interface 420 identifies the requested process information 316B and retrieves process information 316B from process information memory cache 418. When library interface 420 is unable to identify the requested process information 316B, process information manager 408 requests process information 316B from management server 304. In response, management server 304 uses process information management service 326 to retrieve the requested process information 316B (which is included in process information 316A) from process information management service 326 and transmits the requested process information to cluster device 208.

In an embodiment, process information manager 408 requests and receives process information 316B through a process information communication interface 422. Process information communication interface 422 is a communication interface on cluster device 208 for receiving and transmitting process information 316B. In an embodiment, process information communication interface 422 may be included in communication interface 410.

When client daemon 330 receives a request for process information 316B from management server 304, client daemon 330 causes process information manager 408 to retrieve process information 316B from process information memory cache 418. Client daemon 330 may receive a request for process information 316B when a master node issues a request for process information associated with processes in the heterogeneous parallel processing system. Once retrieved, process information manager 408 transmits process information 316B to management server 304 using process information communication interface 422.

Figure 5:
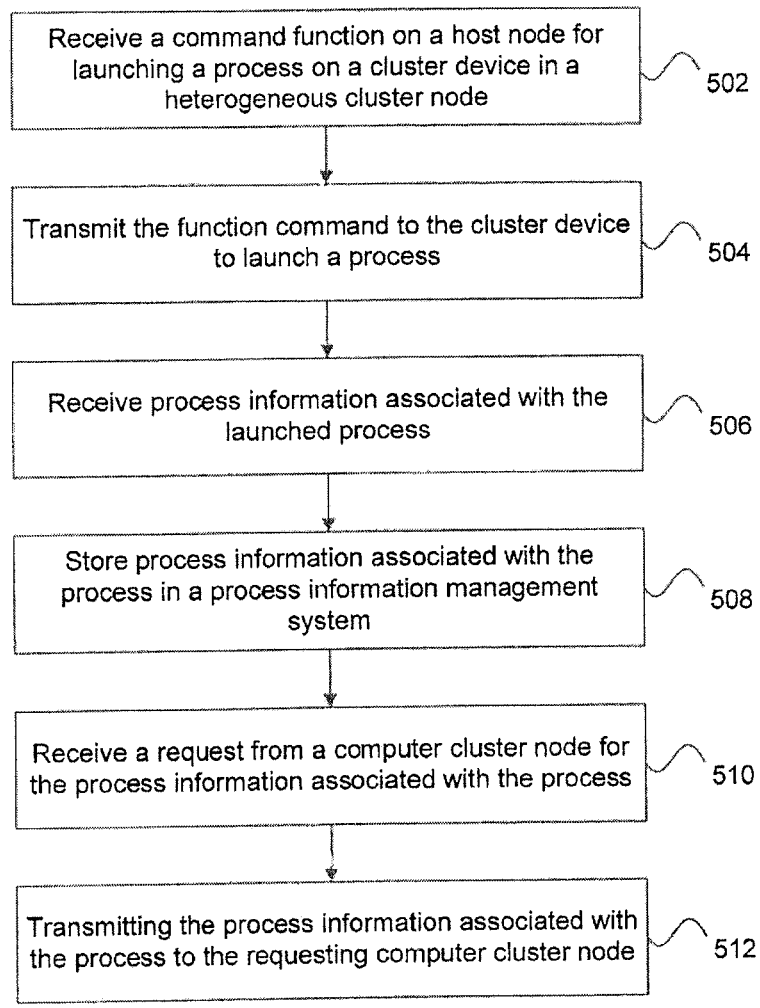
FIG. 5 is a flowchart for a method for sharing process information in a heterogeneous parallel processing system, according to an embodiment.

FIG. 5 is a flowchart 500 of a method for sharing process information in a heterogeneous parallel processing system, according to an embodiment.

At step 502, a command function for launching a process is received. For example, communication module 318 on management server 304 receives a command function, such as "launch_local_proc," to launch process 414 on cluster device 208.

At step 504, the command function is transmitted to a cluster device. For example, command and control interface 324 on management server 304 transmits the command function to cluster device 208. In an embodiment, translation module 320 may translate the function into a language that may be interpreted or executed by cluster device 208.

At step 506, process information is received. For example, management server 304 receives process information associated with process 414 that was launched on cluster device 208. For example, client daemon 330 may launch process 414 using the command function of step 504. As described herein, process information may include process identifier, the address of cluster device 208 and a port number.

At step 508, process information is stored. For example, management server 304 stores process information received in step 506 in process information management service 326. In an embodiment, process information received in step 506 may be stored as process information 316A.

At step 510, a request for process information is received. For example, computer cluster node 204 requests process information associated with the launched process 414. As described herein, management server 304 stores process information 316A that is associated with processes 414 that execute cluster devices 208, as cluster devices 208 may lack sufficient memory to store the process information 316 and execute processes 414. In an embodiment, a master node executing on computer cluster node 204 may request process information to compile a process information listing. In another embodiment, another process executing within computer cluster node 204 may request process information to communicate data or instructions with the launched process 414.

At step 512, a response message that includes the request is transmitted. For example, management server 304 transmits process information to process distribution service 302. Process distribution service 302 may then transmit process information to the master node or another computer cluster node 204.

Figure 6:
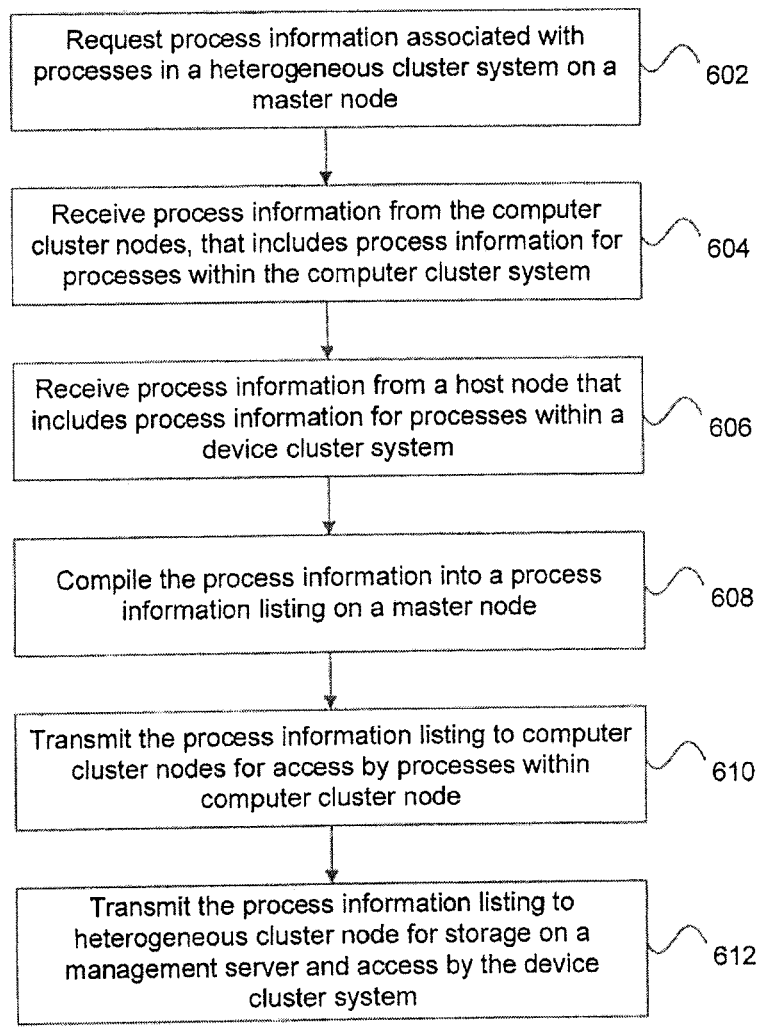
FIG. 6 is a flowchart of a method for distributing process information in a heterogeneous parallel processing system, according to an embodiment.

FIG. 6 is a flowchart 600 of a method for distributing process information in a heterogeneous parallel processing system, according to an embodiment.

At step 602, a request for process information is made. For example, a master node executing on computer cluster node 204 requests process information 316 for processes that execute within a heterogeneous parallel processing system.

At step 604, the process information is transmitted from the computer cluster nodes. For example, computer cluster nodes 204 retrieve process information 316 from process information storage 314 and transmit process information 316 to the master node.

At step 606, the process information for a host node is transmitted. As described herein, host node 204A stores process information 316 for processes that execute within host node 204A. Host node 204A also accesses process information 316A that is stored on management server 204. Management server 204 stores process information 316A associated with processes 414 that are executing on cluster devices 208. Once host node 204A accesses process information 316 and process information 316A, host node 204A transmits process information 316 and process information 316A to the master node.

At step 608, a process listing is compiled. For example, a master node compiles a process information listing from process information 316 and process information 316A transmitted in step 604 and step 606.

At step 610, a process information listing is transmitted to computer cluster nodes. For example, the master node transmits the process information listing to computer cluster nodes 204. The process information listing may be stored as process information 316 in process information storage 314 on computer cluster node 204. Processes executing within computer cluster node 204 may use process information listing to communicate with processes within the heterogeneous parallel processing system, such as, processes 414.

At step 612, a process information listing is transmitted to a host node. As described herein, when host node 204 receives a process information listing, host node 204A transmits the process information listing to management server 304. When process 414 executing on cluster device 208 makes a request for process information associated with a process executing within computer cluster system 104 or another cluster device 208, process 414 makes a request to management server 304 and retrieves the requested process information.

FIG. 7 is a schematic diagram of an example computer system 800 used to implement embodiments of servers 104 and/or clients 106. Various aspects of the various embodiments can be implemented by software, firmware, hardware, or a combination thereof. Example computer system 700 in which an embodiment, or portions thereof, can also be implemented as computer-readable code. After reading this description, it will become apparent to a person skilled in the relevant art how to implement embodiments using other computer systems and/or computer architectures.

Computer system 700 includes one or more processors, such as processor 706. Processor 706 can be a special purpose or a general purpose processor. Processor 706 is connected to a communication infrastructure 706 (for example, a bus or network).

Computer system 700 also includes one or more graphics processing units, such as graphics processing unit ("GPU") 707. GPU 707 is also connected to a communication infrastructure 706. GPU 707 is a specialized processor that executes instructions and programs, selected for complex graphics and mathematical operations, in parallel. For example, GPU 707 may be adept at displaying and processing streaming media content.

Computer system 700 also includes a main memory 708, preferably random access memory (RAM), and may also include a secondary memory 710. Secondary memory 710 may include, for example, a hard disk drive 712 and/or a removable storage drive 714. Removable storage drive 714 may comprise a floppy disk drive, a magnetic tape drive, an optical disk drive, a flash memory, or the like. The removable storage drive 714 reads from and/or writes to a removable storage unit 716 in a well-known manner. Removable storage unit 716 may comprise a floppy disk, magnetic tape, optical disk, etc. which is read by and written to by removable storage drive 714. As will be appreciated by persons skilled in the relevant art(s), removable storage unit 716 includes a tangible computer readable storage medium 724A having stored therein control logic 728B such as computer software and/or data.

In alternative implementations, secondary memory 710 may include other similar means for allowing computer programs or other instructions to be loaded into computer system 700. Such means may include, for example, a removable storage unit 716 and an interface 718. Examples of such means may include a program cartridge and cartridge interface (such as that found in video game devices), a removable memory chip (such as an EPROM, or PROM) and associated socket, and other removable storage units 716 and interfaces 718 which allow software and data to be transferred from the removable storage unit 716 to computer system 700. As will be appreciated by persons skilled in the relevant art(s), interface 718 also includes a tangible computer readable storage medium 724B having stored therein control logic 728C such as computer software and/or data.

Computer system 700 may also include a communications interface 720. Communications interface 720 allows software and data to be transferred between computer system 700 and external devices 722. Communications interface 720 may include a modem, a network interface (e.g., an Ethernet card), a communications port, a PCMCIA slot and card, or the like. Software and data transferred via communications interface 720 are provided to communications interface 720 via a communications path. Communications path may be implemented using wire or cable, fiber optics, a phone line, a cellular phone link, a radio frequency (RF) link or other communications channels.

In this document, the terms "computer program medium" and "computer usable medium" are used to generally refer to media such as removable storage unit 716 and a hard disk 712 installed in hard disk drive 712. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic 728) are stored in main memory 708, such as control logic 728A and/or secondary memory 710, such as control logic 728B. Computer programs may also be received via interface 718, such as control logic 728C. Such computer programs, when executed, enable computer system 700 to implement embodiments as discussed herein, such as the system described above. In particular, the computer programs, when executed, enable processor 706 to implement the processes of embodiments. Accordingly, such computer programs represent controllers of the computer system 700. Where embodiments are implemented using software, the software may be stored in a computer program product and loaded into computer system 700 using removable storage drive 714, interface 718, hard drive 712 or communications interface 722.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer cluster node of a computer cluster system within a heterogeneous parallel processing system, the computer cluster node comprising:
   a memory configured to store a runtime environment; and
   a processor configured to execute the runtime environment, the runtime environment, when executed by the processor, configuring the processor to:
   functionally cooperate with a plurality of computer cluster nodes to execute a first plurality of processes assigned to the computer cluster system, the execution of the first plurality of processes being distributed among the plurality of computer cluster nodes,
   coordinate with the heterogeneous parallel processing system to execute a second plurality of processes to fulfill a request requiring performance of the first plurality of processes and the second plurality of processes, the execution of the second plurality of processes being distributed among a plurality of cluster devices of a device cluster system within the heterogeneous parallel processing system, and request process information from the heterogeneous parallel processing system indicating which cluster devices from among the plurality of cluster devices executed the plurality of second processes.

2. The computer cluster node of claim 1, wherein the computer cluster node is configured to process a request for data from a second computer cluster node from among the plurality of computer cluster nodes, the data being requested by the second computer cluster node to execute one or more processes from among the first plurality of processes distributed to the second computer cluster node.

3. The computer cluster node of claim 1, further comprising:
a communication interface configured to distribute a message between the computer cluster node and the heterogeneous parallel processing system.

4. The computer cluster node of claim 3, wherein the message enables communication and data sharing between the computer cluster node and the heterogeneous parallel processing system.

5. The computer cluster node of claim 1, wherein the second plurality of processes is assigned to the device cluster system.

6. The computer cluster node of claim 1, wherein the heterogeneous parallel processing system is configured to distribute workload corresponding to the first plurality of processes among the plurality of computer cluster nodes.

7. The computer cluster node of claim 1, wherein the computer cluster node is implemented as a master node, the master node being configured to distribute workload corresponding to the second plurality of processes to the plurality of cluster devices.

8. A cluster device of a device cluster system within a heterogeneous parallel processing system, the cluster device comprising:
a memory configured to store a first runtime environment; and
a processor configured to execute the first runtime environment, the first runtime environment, when executed by the processor, configuring the processor to:
coordinate with the heterogeneous parallel processing system to execute one or more processes from among a first plurality of processes to fulfill a request requiring performance of the first plurality of processes and a second plurality of processes,
execute the one or more processes assigned to the device cluster system, execution of the first plurality of processes being distributed among a plurality of cluster devices of the device cluster system, and
map the execution of the one or more processes into a second runtime environment, different from the first runtime environment of a computer cluster node from among a plurality of computer cluster nodes of a computer cluster system within the heterogeneous parallel processing system,
wherein execution of the second plurality of processes assigned to the computer cluster system is distributed among the plurality of computer cluster nodes to fulfill the request.

9. The cluster device of claim 8, wherein the cluster device is configured to process a request for data from a second cluster device from among the plurality of cluster devices, the data being requested by the second cluster device to execute one or more second processes from among the first plurality of processes.

10. The cluster device of claim 8, further comprising:
a communication interface configured to distribute a message between the cluster device and the heterogeneous parallel processing system.

11. The cluster device of claim 10, wherein the message enables communication and data sharing between the cluster device and the heterogeneous parallel processing system.

12. The cluster device of claim 8, wherein the second plurality of processes is assigned to the computer cluster system.

13. A heterogeneous parallel processing system, comprising:
a computer cluster node from among a plurality of computer cluster nodes of a computer cluster system within the heterogeneous parallel processing system, the computer cluster node comprising:
a memory configured to store a first runtime environment; and
a first processor configured to execute the first runtime environment, the first runtime environment, when executed by the first processor, configuring the first processor to:
functionally cooperate with the plurality of computer cluster nodes to execute a first plurality of processes assigned to the computer cluster system, the execution of the first plurality of processes being distributed among the plurality of computer cluster nodes, and
coordinate with a device cluster system within the heterogeneous parallel processing system to execute a second plurality of processes to fulfill a request requiring performance of the first plurality of processes and the second plurality of processes, the execution of the second plurality of processes being distributed among a plurality of cluster devices of the device cluster system, and
request process information from the heterogeneous parallel processing system indicating which cluster devices from among the plurality of cluster devices executed the second plurality of processes; and
a cluster device from among the plurality of cluster devices of the device cluster system comprising:
a second memory configured to store a second runtime environment, different from the first runtime environment; and
a second processor configured to execute the second runtime environment, the second runtime environment, when executed by the second processor, configuring the second processor to:
execute one or more processes from among the second plurality of processes assigned to the device cluster system, and
map the execution of the one or more processes into the first runtime environment.

14. The heterogeneous parallel processing system of claim 13, wherein the computer cluster node further comprises:
a communication interface configured to distribute a message from the computer cluster node to the cluster device; and
wherein the cluster device further comprises:
a second communication interface configured to distribute a message from the cluster device to the computer cluster node.

15. The heterogeneous parallel processing system of claim 14, wherein the message from the computer cluster node to the cluster device and the message from the cluster device to the computer cluster node enable communication and data sharing between the computer cluster node and the cluster device.

16. The heterogeneous parallel processing system of claim 13,
wherein the computer cluster node is implemented as a master node, the master node being configured to distribute workload corresponding to the first plurality of processes to the plurality of computer cluster nodes and workload corresponding to the second plurality of processes to the plurality of cluster devices.

17. The heterogeneous parallel processing system of claim 13, wherein the cluster device is characterized as including less memory or processing power than the computer cluster node.

* * * * *